March 25, 1930.   J. R. FRANCIS   1,751,511
COMBINED CHARGE AND AIR HEATER FOR INTERNAL COMBUSTION ENGINES
Filed May 1, 1923   3 Sheets-Sheet 1
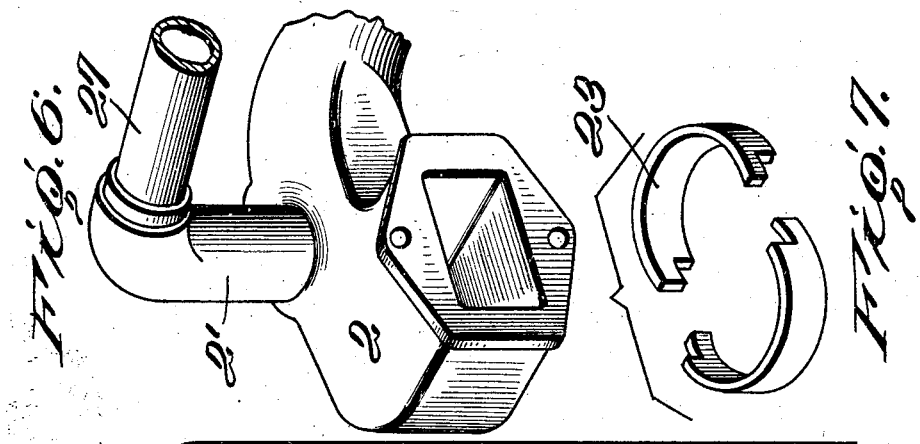
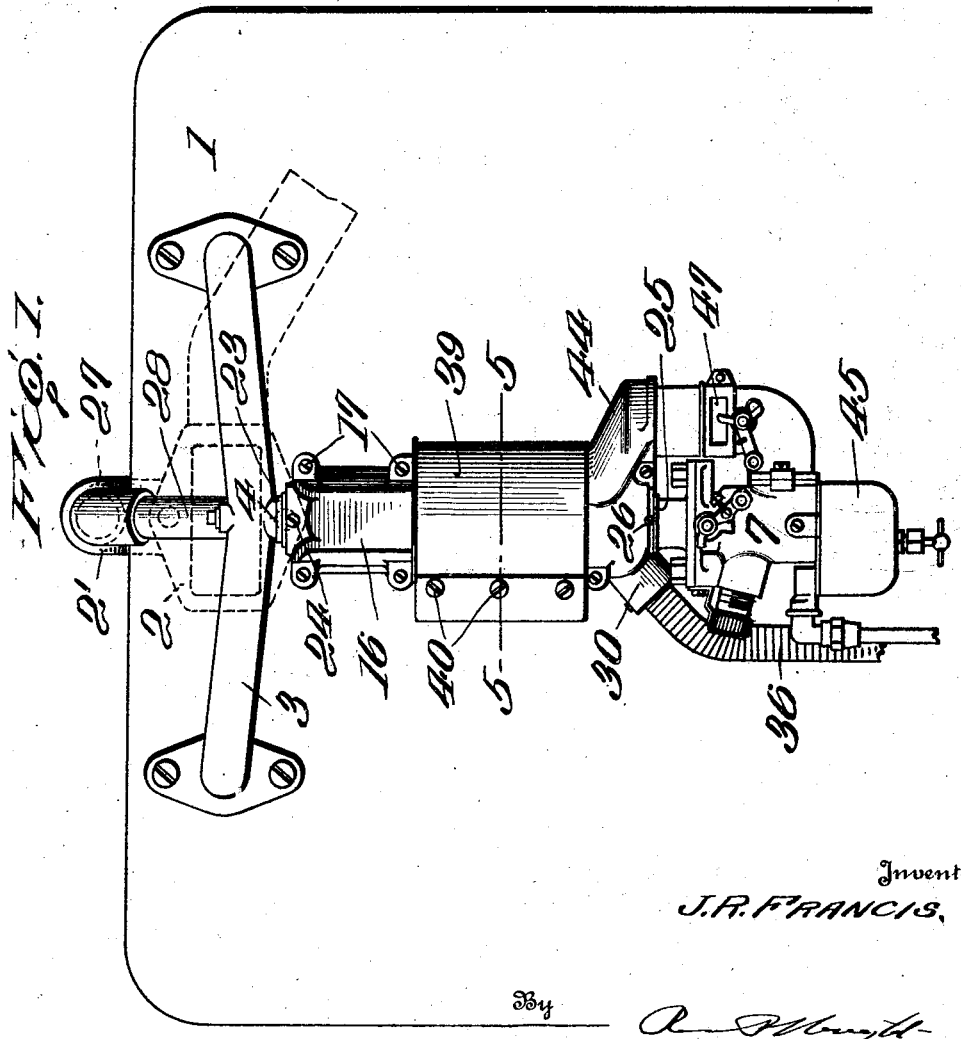
Inventor
J. R. FRANCIS.
By
Attorney March 25, 1930. J. R. FRANCIS 1,751,511
COMBINED CHARGE AND AIR HEATER FOR INTERNAL COMBUSTION ENGINES
Filed May 1, 1923 3 Sheets-Sheet 2

Inventor
J. R. FRANCIS.

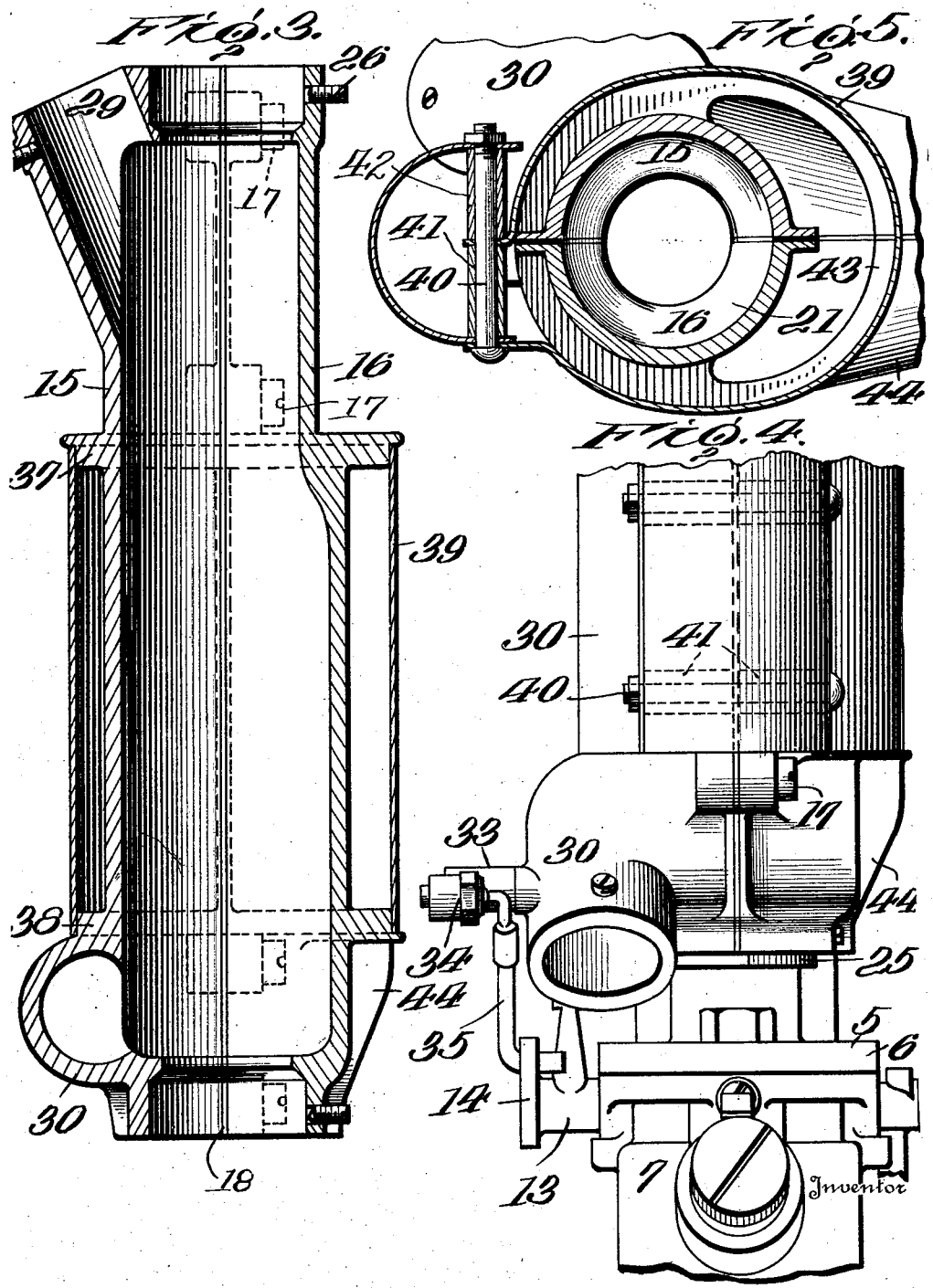

Patented Mar. 25, 1930

1,751,511

UNITED STATES PATENT OFFICE

JACOB RICHARD FRANCIS, OF FLINT, MICHIGAN

COMBINED CHARGE AND AIR HEATER FOR INTERNAL-COMBUSTION ENGINES

Application filed May 1, 1923. Serial No. 635,907.

This invention relates to a combined charge and air heater for internal combustion engines, the object being to provide novel means for heating the air delivered to the charge forming device for heating the charge in its passage from the charge forming device to the internal combustion engine.

Another and further object of the invention is to provide a heater in which the passage of the heating medium through the same is controlled by the position of the throttle of the charge forming device.

A further object of the invention is to provide a heater formed of sections so constructed that they can be readily placed in position around the ordinary intake manifold of an internal combustion engine.

Other and further objects and advantages of the invention will be hereinafter set forth and the novel features thereof defined by the appended claims.

In the drawings—

Figure 1 is a side elevation of an internal combustion engine showing the application of my improved construction of charge and air heater thereto;

Figure 3 is a vertical section through the heater taken at right angles to the section shown in Figure 2;

Figure 4 is a detail elevation of the lower portion of the heater showing the manner of connecting the same to the charge forming device;

Figure 5 is a section taken on line 5—5 of Figure 1;

Figure 6 is a detail perspective view of a portion of the exhaust manifold; and

Figure 7 is a perspective view of the sectional compression ring.

Figure 2:
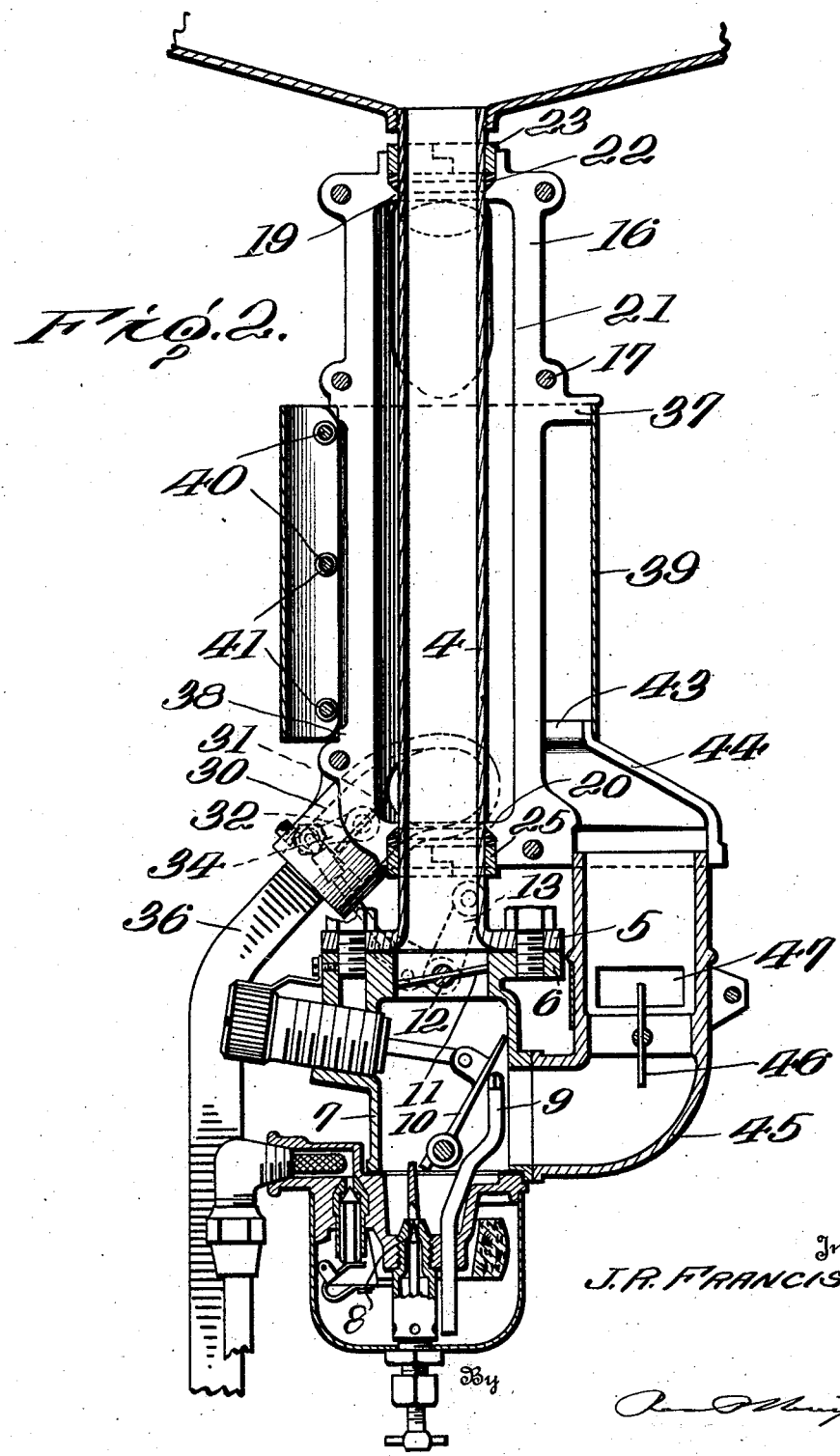
Figure 2 is an enlarged vertical section through the charge forming device and heater.

In the drawings 1 indicates an internal combustion engine provided upon one side with an exhaust manifold 2 and upon the other side with an intake manifold 3 provided with a substantially vertical feed portion 4 having a flanged lower end 5 adapted to be connected to the flanged upper end 6 of a charge forming device 7 constructed substantially in the same manner as shown in the application of Albert G. Redmond, filed May 26, 1922, Serial Number 563,821.

The charge forming device is provided with a low speed nozzle 8, a high speed nozzle 9 and a suction controlled valve 10. The outlet of the charge forming device is provided with the usual throttle valve 11 carried by a valve stem 12, on one end of which is arranged a collar 13 provided with an arm 14. The above description is given so that the operation of my improved construction of charge and air heater can be readily understood.

In the embodiment of my invention as herein shown is a charge and air heater especially constructed to be used in connection with a Chevrolet motor to be installed thereon without removing the parts of the motor.

My improved construction of heater comprises a pair of sections 15 and 16 having flanged edges secured together by screws 17, a gasket 18 being preferably arranged between the abutting faces of the flanges forming a tight joint. The sections are provided with substantially semi-circular registering flanges 19 and 20 forming an annular heat chamber 21 around the vertical portion 4 of the intake manifold of the carbureter when the sections are united.

The upper flanges 19 are provided with beveled upper faces on which is adapted to be arranged a gasket 22 forced into engagement with the intake manifold by a sectional compression ring 23, which is locked in position by a set screw 24. The lower faces of the sections 20 are beveled to receive a gasket which is forced into engagement with the intake manifold by a sectional compression ring 25, which is locked in position by a set screw 26. This provides means for preventing the escape of the heating fluid and allows the sections to be placed in position around the vertically disposed portion of the intake manifold.

The exhaust manifold of the internal combustion engine is provided with a branch 2′ to which is connected a pipe 27 extending across the head of the motor vehicle having a downwardly extending end portion 28 extending into a lateral inlet 29 and secured therein by a set screw. This provides means for conveying a portion of the exhaust gases from the exhaust manifold into the annular heating chamber 21 surrounding the feed portion of the intake manifold of the internal combustion engine.

The lower end of the heating chamber is provided with an outlet nipple 30 in which is mounted a pivoted valve 31 carried by a stem 32, on the other end of which is secured a collar 33 provided with an arm 34 which is connected to the arm 14 of the throttle valve by an adjustable link 35, whereby the movement of the throttle valve of the charge forming device will control the position of the outlet of the heating chamber, said valve being so set that when the throttle valve is practically closed, the valve 31 is open and when the throttle valve is in full open position, the valve 31 is substantially closed. It is, of course, understood that the setting of these valves can be changed, but in order to produce the most efficient combustible mixture I have found that the best results can be obtained by gradually reducing the heating medium as the throttle valve is moved into open position.

The outlet 31 has secured therein a flexible pipe 36 for conveying the exhaust gases away from the engine and charge forming device to the atmosphere. It is, of course, understood that these exhaust gases can be conveyed back into the main exhaust line if desired.

From the construction so far described, it will be seen that I have provided means for heating the charge delivered from the charge forming device in its passage to the internal combustion engine, composed of a heating jacket formed of a pair of sections adapted to be secured around the intake manifold in such a manner that an annular heat jacket is formed, the outlet of which is controlled by the position of the throttle valve.

In order to utilize the heat radiating from the outer wall of the annular jacket for heating the air delivered to the charge forming device, I provide the outer walls of the sections forming said heat jacket with substantially semi-circular rabbeted flanges 37 and 38, which are arranged eccentrically to the outer wall of the heat jacket as clearly shown and around which is adapted to be arranged a flexible shell 39 forming an annular chamber through which air is adapted to pass and be conveyed to the air inlet of the charge forming device.

The flexible shell 39 is clamped on the flanges 37 and 38 by bolts 40, which are provided with spacing sleeves 41 for holding the free ends of the shell spaced apart to provide an air inlet. Carried by these bolts is a substantially semi-circular strip of flexible metal spaced from one end of the shell by spacing sleeves 42 as clearly shown. This provides means for admitting air to the shell to cause the same to travel in a curved path and as the air inlet of the shell is at a point of less area of the heating chamber, the air is thoroughly heated in passing through the heating chamber formed by the shell.

The bottom flange 38 is provided with an outlet 43 in communication with an outlet branch 44 formed by two abutting substantially semi-circular portions carried by the respective sections of the heater and into which is adapted to extend the upwardly extending air inlet pipe 45 of the charge forming device 7, said air inlet pipe being provided with a choker valve 46 and an auxiliary shutter controlled air inlet 47 whereby the temperature of the air delivered to the charge forming device can be regulated, as by operating the rotary shutter, the area of the air inlet 47 can be increased or decreased to admit cold air into the air inlet pipe.

The operation of a combined charge and air heater as herein shown and described when used in connection with an internal combustion engine is as follows: The exhaust gases are conveyed by the branch pipe from the main exhaust manifold into the heating jacket surrounding the feed portion of the intake manifold of the internal combustion engine and heat the charge in its passage to the engine, the application of heat to the heating jacket being controlled by the throttle controlled outlet so that the volume of the heating medium passing through the heating chamber is automatically regulated. The air is taken into the air inlet of the air chamber surrounding the heating jacket and heated in its passage around said heating chamber and discharged at its lower end through the outlet pipe into the air inlet of the charge forming device, so as to produce a very efficient combustible mixture.

From the foregoing description it will be seen that I have provided a charge and air heater for internal combustion engines in the form of a heating jacket having a pair of concentrically arranged heating chambers, one of which is used for heating air and the other for heating the charge in its passage to the internal combustion engine, said jacket being formed sectional so that it can be readily clamped around an ordinary intake manifold.

What I claim is:—

1. The combination with an internal combustion engine having an exhaust manifold, intake manifold and a charge forming device connected thereto, provided with a throttle valve, of a detachable heating jacket surrounding said intake manifold, means for conveying exhaust gases from said exhaust manifold to said heating jacket, means operated by the throttle for controlling the passage of exhaust gases through said jacket, a detachable concentric shell surrounding said jacket provided with an air inlet and means for conveying the air passing through said jacket to the air inlet of the charge forming device.

2. A combined charge and air heater for internal combustion engines comprising a pair of detachable members adapted to be secured over an induction pipe to form a heating jacket in the space between the inner walls of said members and the outer wall of said induction pipe, a detachable flexible shell arranged around said members and spaced therefrom to form a chamber having an air inlet, said chamber being provided with an outlet.

3. A combined charge and air heater for internal combustion engines comprising a pair of detachable flanged members adapted to be clamped together around an induction pipe to form a heating chamber, said chamber being provided with an inlet and an outlet, said members being provided with horizontally disposed flanges, a detachable flexible shell arranged around said flanges having its ends secured together and spaced apart to form an air inlet, one of said flanges being provided with an air outlet.

4. The combination with an internal combustion engine having an exhaust manifold, intake manifold and a charge forming device connected thereto provided with a throttle valve, of a detachable heating jacket surrounding a portion of said intake manifold having an inlet at its upper end and an outlet at its lower end, means for conveying exhaust gases from the exhaust manifold to the inlet of said jacket, means operated by the throttle of said charge forming device for regulating the volume of exhaust gases passing through said heating jacket, a detachable air chamber surrounding said heating jacket having an air inlet and an air outlet and means for conveying the heated air from said chamber to the air intake of said charge forming device.

5. The combination with an internal combustion engine having an exhaust manifold, intake manifold and charge forming device connected thereto, of a detachable combined charge and air heater surrounding said intake manifold having concentrically arranged chambers, means for conveying the exhaust gases from the exhaust manifold to the inner chamber for heating the charge in its passage through the intake manifold and means for conveying air from the outer chamber to the air inlet of the charge forming device.

6. The combination with an internal combustion engine having an exhaust manifold, intake manifold and a charge forming device connected thereto provided with a throttle valve, of a detachable sectional heating jacket surrounding the intake manifold having an annular chamber, means for conveying exhaust gases from said exhaust manifold to said chamber, said chamber being provided with a valve controlled outlet, a connection from said valve to the throttle valve of the charge forming device, a detachable flexible shell surrounding said heating chamber forming an air chamber provided with an air inlet and means for conveying the heated air from said last mentioned chamber to the air inlet of said charge forming device.

7. A device of the kind described comprising a pair of detachable members adapted to be clamped around the intake manifold of an internal combustion engine, said members being provided with registering flanges adapted to engage the intake manifold to form an annular chamber, means for conveying exhaust gases to said chamber, said members being provided with external flanges, a detachable flexible shell secured around said flanges having its ends secured together and spaced apart to form an air inlet, one pair of said flanges being provided with an air outlet.

8. A device of the kind described comprising a pair of concentric detachable members adapted to be secured together over an intake manifold to provide an annular chamber having an inlet at its upper end and an outlet at its lower end, said members being surrounded by a flexible shell to form a chamber, said chamber having an air inlet and an air outlet.

9. The combination with an internal combustion engine having an exhaust manifold, intake manifold and a charge forming device connected thereto provided with a throttle valve, of a detachable combined charge and air heater surrounding said intake manifold provided with concentrically arranged chambers, the inner chamber being in communication with the exhaust manifold and the outer chamber being in communication with the atmosphere, means operated by the throttle for controlling the passage of exhaust gases through said chamber and means for conveying the heated air passing through the other chamber to the charge forming device.

10. The combination with an internal combustion engine having an exhaust manifold, intake manifold and a charge forming device connected thereto provided with a throttle valve, of a detachable sectional heater arranged over the intake manifold composed of a pair of members adapted to be clamped around the manifold to provide an annular chamber, said chamber having an inlet at its upper end in communication with the exhaust manifold and a valve controlled outlet at its lower end, a connection between said valve and the throttle valve of the charge forming device, a detachable shell surrounding said sections to form an annular chamber provided with an air inlet and an air outlet and means for conveying heated air from said air outlet to the air inlet of the charge forming device.

11. The combination with an internal combustion engine having an exhaust manifold, intake manifold and charge forming device connected thereto provided with a throttle valve, of a detachable heater surrounding said intake manifold having an annular heating chamber in communication at its upper end with the exhaust manifold and provided with a valve controlled outlet, means operated by the throttle valve for actuating said valve, a detachable shell arranged around said chamber having an air inlet and outlet, a pipe connected to the air outlet for conveying the heated air to the air inlet of said charge forming device and a valve controlled air inlet in said pipe for regulating the temperature of air delivered to said charge forming device.

12. A combined charge and air heater comprising a pair of detachable members adapted to be secured together around an induction pipe to provide an annular heating chamber, said heating chamber being provided with means at its upper end for admitting a heating medium and means at its lower end for controlling the outlet of said heating medium, said members being provided with registering flanges, a detachable flexible shell secured over said flanges to provide an annular chamber having an air inlet and an air outlet.

13. In a device of the kind described, the combination with an internal combustion engine having an exhaust manifold, intake manifold and a charge forming device connected thereto, of a pair of detachable members adapted to be clamped around the intake manifold to provide an annular heating chamber, means for conveying exhaust gases from the exhaust manifold to said chamber, a detachable shell secured around said members and spaced therefrom to provide an annular chamber having an air inlet and means for conveying heated air from said chamber to said charge forming device.

14. The combination with an internal combustion engine having an exhaust manifold, intake manifold and charge forming device connected thereto of a pair of detachable members adapted to be clamped around the intake manifold having flanges at its upper and lower ends to provide an annular chamber surrounding the intake manifold, means for conveying exhaust gases from the exhaust manifold to said heating chamber, means for controlling the volume of exhaust gases passing through said chamber, a detachable shell surrounding said members forming an annular chamber having an air inlet and means for conveying heated air from said last mentioned chamber to the air intake of said charge forming device.

15. The combination with an internal combustion engine having an intake manifold and a charge forming device connected thereto, of a detachable heating jacket surrounding said intake manifold, means for conveying exhaust gases from said engine to said heating jacket, a detachable shell arranged around said heating jacket and spaced therefrom to provide a chamber having an air inlet and an air outlet and means for conveying heated air from said air outlet to the charge forming device.

16. A device of the kind described comprising a pair of detachable members adapted to be clamped together around the induction pipe of an internal combustion engine to provide an annular heating chamber, said members being provided with external flanges and a detachable shell secured on said flanges around said members to provide an air heater.

In testimony whereof I hereunto affix my signature.

JACOB RICHARD FRANCIS.